Aug. 22, 1933.  C. A. ECKBERG  1,923,358
CHEESE PROCESSING MACHINE
Filed April 27, 1931
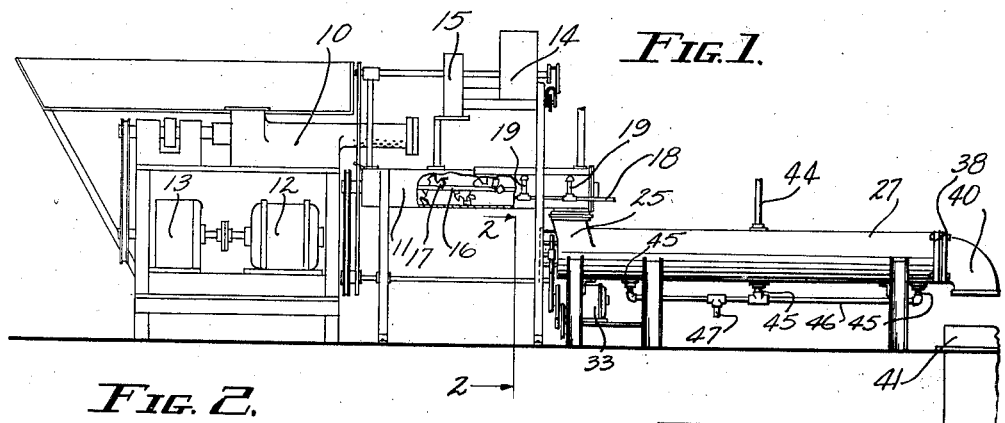
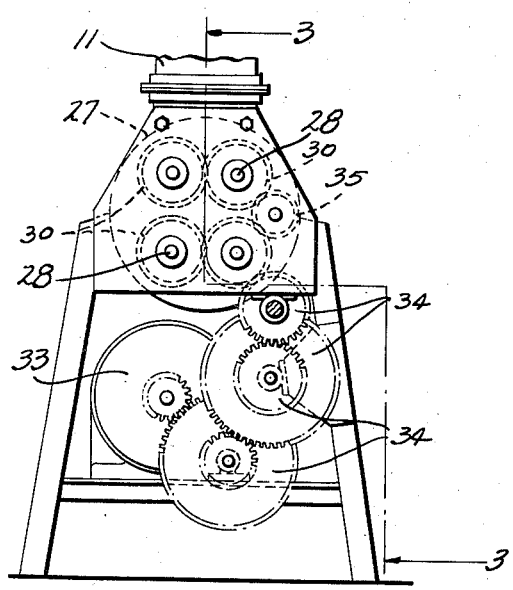
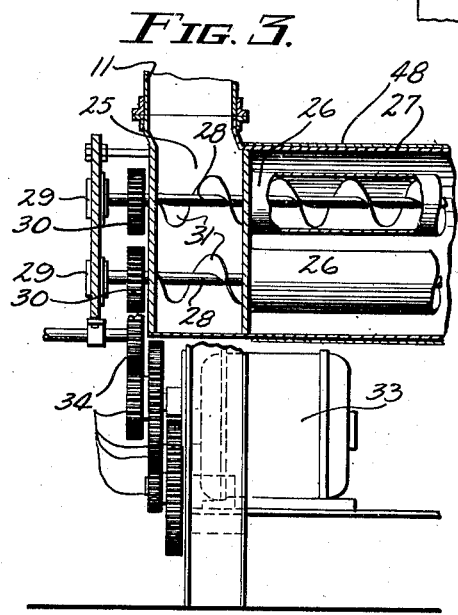
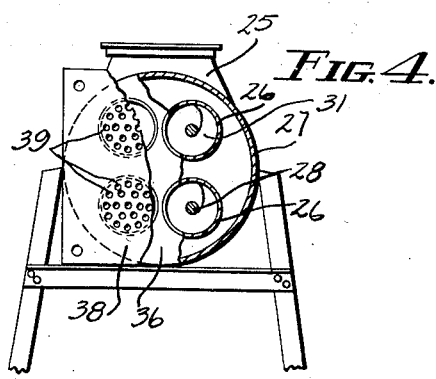
INVENTOR
Charles Andrew Eckberg
BY
Wheeler, Wheeler & Wheeler
ATTORNEYS Patented Aug. 22, 1933

1,923,358

UNITED STATES PATENT OFFICE 1,923,358

CHEESE PROCESSING MACHINE

Charles Andrew Eckberg, Plymouth, Wis., assignor to Lakeshire Cheese Company, Plymouth, Wis., a Corporation of Wisconsin Application April 27, 1931. Serial No. 533,033

5 Claims. (Cl. 99—2)

My invention relates to improvements in cheese processing machines of that type in which a continuously flowing stream of comminuted cheese is pasteurized preparatory to repackaging it in containers, or blended without pasteurization.

In some of the machines heretofore used a cheese grinder has been directly associated with a cheese melting chamber provided with an agitating conveyor, receiving cheese directly from the grinder and delivering it to a mixing or blending chamber, the cheese being reduced substantially to a liquid condition in the melting chamber.

In some of the machines of the described type steam is injected directly into or against the mass of cheese in the melting chamber to reduce the same to a liquid or semi-liquid condition within a few seconds and accomplish a desired degree of pasteurization, but in some cases the condensation of steam tends to produce a pasteurized cheese product having a moisture content in excess of that which is desirable.

An object of this invention is to provide improved means for mixing and blending cheese delivered from a pre-heating or so-called melting chamber and for additionally heating it without addition of moisture, whereby, in pre-heating chambers which receive steam in direct contact with the cheese, the chamber may be shortened, the quantity of steam reduced, or the movement of the cheese through the steam accelerated, with a corresponding reduction in the moisture content of the finished product.

A further object is to facilitate the continuous and uniform heat treatment of cheese, with minimum adhesion to container walls, adequate blending, and improved quality of product.

A further object of my invention is to provide means for sub-dividing the cheese delivered from the melting chamber by conveying it through a series of tubular passages surrounded by a heating fluid, the heat of which may be transferred by conduction through the walls of tubes having a relatively large area in proportion to the capacity of the individual tubes. The absorption of such heat is accelerated by agitation of the cheese by a conveyor within each tube and by the progressive movement of the cheese longitudinally of the wall of the tube.

In the drawing:

Figure 1 is a general view, in side elevation, of cheese pasteurizing apparatus embodying my invention.

Figure 2 is an end elevation of the improved portion of the apparatus, showing one of the shafts in cross section, taken on line 2—2 of Figure 1.

Figure 3 is a sectional view taken on line 3—3 of Figure 2.

Figure 4 is a rear end elevation of the improved portion of the apparatus with the delivery spout removed and portions of the end wall, the enclosing jacket, and two of the tubes broken away in vertical section.

Like parts are identified by the same reference characters throughout the several views.

In Figure 1 the cheese grinder 10 and the melting chamber 11, the motor 12 with associated transmission gear box 13, the associated shafting and grinder driving connections, and the chemical and salt reservoirs 14 and 15 and their feeding mechanism, may all be assumed to be of ordinary construction.

The melting chamber 11 is similar to that shown and described in Letters Patent No. 1,523,678, dated January 20th, 1925, granted to John H. Wheeler and Henry Murray Scott, for Cheese treating apparatus, but in the construction as shown in Figure 1 the conveyor shaft 16 is provided with so-called broken and folded flights or flight members 17, these having been found more satisfactory than the paddles shown in the aforesaid patent. Steam is delivered into the chamber through a pipe 18 having branched nozzle supply pipes 19 through which the steam is delivered into the melting chamber near the top thereof.

Melting by direct delivery of steam into contact with cheese which is being conveyed across the paths of the steam jets is advantageous for the reason that cheese can thus be reduced to a substantially liquiform condition within a few seconds, i. e. within from six to ten seconds in the apparatus disclosed in the aforesaid Patent #1,523,678. This quick melting of the cheese is largely accomplished by conversion of latent heat into sensible heat in the conveyor chamber 11. Substantially all of the steam is condensed as it comes into contact with the relatively cool cheese, only a little escaping vapor being observable at the opening where the cheese is fed into the chamber. This quick melting avoids thermo-chemical changes such as occur if the cooking of the cheese is prolonged.

When melting cheese in jacketed containers by transfer of heat from the jacket fluid to cheese which is being agitated within a container, the heat transfer is relatively slow and in any such melter, of a capacity adapted for commercial purposes, a considerable number of minutes will be required to raise the temperature of the cheese across the critical range where rapid oil separation occurs, i. e. a temperature range between 110° F. and 120° F.

While complete melting and blending of cheese within a steam receiving chamber tends to increase the water content of the product beyond the legal limit established under the laws of many states, it avoids baking upon jacketed container walls; avoids the production of a grainy or stringy product produced by thermo-chemical change, and avoids excessive oil separation by an almost instant rise in temperature across the oil separation range.

I have discovered that by employing a comparatively short steam chamber, (of the general character described in said Letters Patent #1,523,678) as a pre-warming chamber, the cheese can be reduced to a generally liquiform condition, which facilitates feeding it through jacketed tubes for a final heating to the desired pasteurizing or sterilizing temperature, and that blending is also facilitated, since the conveyors of the jacketed chambers or tubes are operated in liquiform material. The means for finally heating, mixing, and blending the material will now be described.

From the bottom of the melting chamber, at its rear end, the cheese is delivered downwardly into the receiving hopper 25 of a mixing and blending attachment embodying the invention herein set forth. The cheese is fed by conveyors from this hopper through a set of tubular passages 26, of which there are four in the construction shown, preferably arranged in superposed pairs within an enclosed cylindrical jacket 27. Each conveyor extends across the hopper through one of the tubes, and its shaft 28 has bearings in the outer wall of the hopper. Its adjacent end is also preferably supported in an outboard bearing 29, and a driving gear 30 is fixed to the shaft between the bearings. In the construction shown, the conveyor flight for each shaft 28 comprises an ordinary helical blade 31, although any ordinary screw conveyor may be employed. The bearing 29 is a thrust bearing resisting the counter pressure exerted by the blade upon the shaft.

Motion is transmitted from a motor 33 to the driving gears 30 of the lower set of shafts 28 through a suitable train of reduction gears 34, and from one of the lower gear wheels 30 motion is transmitted to one of the gears 30 of the upper set through an intermediate reversing gear 35. The gears 30 of each set are intermeshed, whereby the shafts and associated conveyors of each set are driven in opposite directions. By thus arranging the conveyors in pairs and driving them in opposite directions, the cheese is very effectively fed from the hopper 25 into the respective tubes 26.

At the rear end of the mixer the tubes 26 extend through the head 36 of the cylindrical jacket 27. Each tube is partially closed by an end wall 38, preferably common to all the tubes. This wall is provided with a series of apertures or ports 39, each set or series of such apertures being in registry with the respective tubes, whereby the melted cheese may be forced through the apertures by the conveyor. Preferably, the conveyors are not provided with bearings at their rear ends, these ends being free to move slightly with a floating action in the cheese, although the conveyor flights fit the respective tubes closely enough to prevent objectionable lateral movement of the shafts. The end wall 38 is preferably rectangular, with corner portions extending beyond the jacket 27, whereby a discharge spout 40 (Figure 1) may be bolted to this wall and utilized to deliver the cheese downwardly into a receiving hopper 41 mounted in the floor or table upon which the above described apparatus is supported.

Heating fluid, preferably hot water or steam, is delivered to the jacket 27 through a supply pipe 44 from any suitable source of supply, to which it is returned through outlet pipes 45 at its respective ends, and preferably at an intermediate point. These outlet pipes are connected by a pipe 46 leading to a return main 47, whereby a continuous gravity circulation of the heating fluid may be maintained. If desired, the jacket 27 and the associated pipes may be provided with a heat insulating covering, fragments of which are indicated at 48.

With the above described construction, the cheese need not be completely melted or pasteurized in the melting chamber 11, but it will be sufficiently liquefied to facilitate feeding it from the hopper 25 into the several tubes 26 and simultaneously blending the melted and unmelted portions and thoroughly mixing the emulsifying and flavoring materials, as well as the particles of cheese having different characteristics, in cases where a blended cheese is to be produced. The partially liquefied cheese can thus be moved through the relatively small tubes 26 with sufficient rapidity to prevent adhesion or any baking of the material upon the interior surfaces of such tubes. Also, the rotation of the conveyor may be sufficiently rapid to continuously move cheese particles from the vicinity of the shaft outwardly into proximity or contact with the tube surfaces, thereby quickly displacing the more highly heated particles previously occupying such space and forcing them toward the axis of the tube. It is, therefore, possible to bring the cheese to a desired temperature, varying in accordance with the quality and age of the cheese that is being treated, but ordinarily ranging between a temperature of about 140° F. to a temperature of about 170° F., although higher temperatures may be desirable in some cases and lower temperatures in other cases.

The cylinders or tubes 26 are relatively small in diameter as compared with the diameter of the melting chamber or with that portion of the melting chamber occupied by its conveyor. But the combined capacity of the tubes 26 and their associated conveyors for delivery of cheese is preferably made equal, or substantially equal, to the delivery capacity of the melting chamber, whereby in the operation of the machine the hopper 25 may be kept filled with a supply of cheese to be fed through the tubes 26. If desired, the combined capacity of the tubes 26 may be made slightly below the delivery capacity of the melting chamber for the reason that whenever a slight back pressure builds up in the hopper 25, the pressure at the delivery end of the melting chamber may be built up by the conveyor therein which, in turn, will accelerate the normal flow through the tubes 26 sufficiently to maintain a balance between the deliveries from the melting chamber and those from the tubes 26. On the other hand, if the tubes 26 have a slight excess capacity, a reduction of the supply in the chamber 25 will result in a slight reduction in the flow of cheese through the tubes, particularly those of the upper set, and allow a balanced delivery from the melting chamber and the tubes to be maintained. It is therefore not essential that the combined capacity of the tubes 26 should be exactly equal to that of the melting chamber 11. The cheese melting efficiency of the machine may be varied by varying the temperature or quantity of steam delivered to the melting chamber 11, by changing the conveyor speeds, or by varying the temperature of the heating fluid in the jacket 27. The moisture content of the product may also be varied by superheating the steam used in chamber 11, or by decreasing its volume, and correspondingly raising the temperature of the heating fluid in the jacket 27.

I claim:

1. In a machine for heat treating cheese by direct contact of steam with the cheese to be treated, a mixing, superheating and blending attachment comprising the combination with the steam treating means, of a receiving hopper having a series of tubes leading therefrom, means for feeding liquiform cheese into said hopper, conveyors, each extending from the hopper into one of the tubes and adapted to force cheese from the hopper therethrough, a fluid containing jacket enclosing said tubes, and means for circulating a heating fluid through said jacket, said tubes having a combined capacity for continuous delivery of cheese which is also being continuously delivered to the tubes by said steam treating means.

2. In a machine for heat treating cheese, the combination with means for preheating cheese to a generally liquiform condition, of a mixing, superheating and blending attachment comprising a hopper for receiving the preheated cheese, said preheating means being adapted for continuous delivery of said liquiform cheese into the hopper, a series of tubes leading from said hopper and having partially obstructed outlets, whereby the volume of cheese fed into the hopper is substantially equally distributed to the tubes, rotary conveyors, one for each tube, adapted to force cheese from the hopper through the tubes and their outlets, a fluid containing jacket enclosing said tubes, and means for circulating a heating fluid through said jacket, said conveyors being arranged in pairs and provided with means for rotating the members of each pair in opposite directions in proximity to each other within the hopper to facilitate blending the cheese and feeding it into the tubes.

3. In apparatus for heat treating cheese, the combination with means for preheating cheese to a generally liquiform condition, of a hopper arranged to receive cheese from the outlet end portion of the preheating means, said preheating means being adapted for continuous delivery of cheese into said hopper, and said hopper being provided with multiple outlet tubes of relatively small capacity with reference to that of the preheating means, said outlet tubes having a combined capacity so proportioned to the capacity of the preheating means as to provide for substantially equal distribution of the cheese fed from the hopper, each tube having an associated conveyor for feeding cheese therethrough from the hopper, and exterior means for heating the walls of the tubes.

4. In apparatus for heat treating cheese, the combination with a cheese steaming chamber adapted to deliver cheese continuously in a substantially liquiform condition, of a hopper adapted to receive the preheated cheese from the cheese steaming chamber, and provided with multiple outlet passageways of relatively small capacity with reference to the cheese steaming chamber, each passageway having a mixing conveyor for forcing the cheese therethrough, exterior means for heating the passage walls, and a perforate wall at the outer end of each passage through which the cheese may be forced, said perforate walls serving to compel distribution to said tubes, the combined capacity of which is so proportioned to the capacity of the steaming chamber as to permit continuous operation.

5. In apparatus for heat treating cheese, the combination of a hopper, of means for continuously steam treating cheese to reduce it to a substantially liquiform condition, means for feeding such liquiform cheese into said hopper, a series of outlet tubes leading from said hopper, conveyors adapted to deliver predetermined quantities of cheese through said passages, and exterior means for heating the walls of said passages, said passages and their respective conveyors being adapted for a combined delivery of cheese from the hopper substantially equal to that received through the hopper inlet.

CHARLES ANDREW ECKBERG.